United States Patent [19]

Hamane et al.

[11] 4,396,042

[45] Aug. 2, 1983

[54] WIRE CUTTING APPARATUS FOR WIRE WINDING MACHINE

[75] Inventors: Tokuhito Hamane, Hirakata; Toshio Kinoshita, Katano; Masafumi Kihira, Hyogo, all of Japan

[73] Assignee: Matsushita Electric Industrial Co., Ltd., Kadoma, Japan

[21] Appl. No.: 237,405

[22] Filed: Feb. 23, 1981

[51] Int. Cl.³ .............................................. B21F 3/04
[52] U.S. Cl. ................................................. 140/92.1
[58] Field of Search .................... 140/1, 92.1; 29/596, 29/597, 598; 83/401, 909

[56] References Cited

U.S. PATENT DOCUMENTS

| | | | |
|---|---|---|---|
| 3,724,515 | 4/1973 | Eminger | 140/92.1 |
| 3,828,830 | 8/1974 | Hill et al. | 140/92.1 |
| 3,872,897 | 3/1975 | Droll et al. | 140/92.1 |
| 4,121,627 | 10/1978 | Schmid | 140/92.1 |

FOREIGN PATENT DOCUMENTS 55-26076 2/1980 Japan.

Primary Examiner—Carl E. Hall
Assistant Examiner—Jonathan L. Scherer
Attorney, Agent, or Firm—Wenderoth, Lind & Ponack

[57] ABSTRACT

A wire cutting apparatus for use in a winding machine which winds an electric wire or the like round a spool, wherein one terminal wire leading to the coil from the terminal wires formed through the drawing operation of the wire is cleared to remove the entwinement with the cutting arm, the other terminal wire leading to the nozzle of the flyer is descended together with the clamp pawl, with the result that the terminal wire is not involved in the flyer even if the terminal wire is floated after the clamp pawl has released the terminal wire.

6 Claims, 10 Drawing Figures

WIRE CUTTING APPARATUS FOR WIRE WINDING MACHINE

BACKGROUND OF THE INVENTION

The present invention relates to a wire cutting apparatus for use in a winding machine which winds an electric wire or the like round a spool.

Conventionally, various winding machines for winding a wire to form a coil are normally provided with wire cutting apparatuses for cutting the end of the coil wire, for example, such as the one shown in FIGS. 1 to 3. Referring to FIG. 1, a main body bracket 1 has a pair of cutting arms 3 and 4 rotatably mounted on shafts 2 and have springs 5 connected thereto which normally urge cutting arms 3 and 4 in respective directions to separate them from each other. Each of the cutting arms 3 and 4 is respectively provided at one end with a cutting edge 7 and a clamp portion 6 and with a roller 8 at the other end, and a pin 9 at the center thereof. A rotary shaft 10, which is vertically supported on the main body bracket 1, is rotationally oscillated by a piston-cylinder device 11 through a link 12, a pin 13 and a lever 14. A lever 15 is attached to the bottom end of the rotary shaft 10 and a cam 16, which is secured to the lever 15, is provided at its ends with a wedge-shaped portion 16a and at its middle portion with a parallel sided portion 16b. A hook 17 for drawing the wire laterally of its normal path is rotatably supported on the cam 16 on the shaft 18. A tension spring 19, which is provided on the hook 17, extends between a pin 20 on the hook and a pin 21 provided on the cam 16 and a stop pin 22 is provided on the main body bracket 1 which is mounted on the stationary plate 23 through shafts 24 and 27. The shaft 24 supports the main body bracket 1. Bolts 25 secure the support shaft 24 and a shaft lock means 26 having a hole therein, through which the shaft 24 is engaged, the hole having a split groove formed in one portion. The support shaft 27 supports the shaft lock means 26 and is secured to the plate 23 in a shaft fixture 28. The shaft fixture 28 has a hole, through which the support shaft 27 is engaged, the hole having a split groove formed in its one portion. The shaft fixture 28 allows the support shaft 27 to be freely slid therethrough. The support shaft 27 is secured with a bolt 29 in the shaft fixture 28 when the position of the shaft is determined.

The cutting operation of the wire 30 and the clamping operation will be described hereinafter. The cylinder 11 is operated starting from the condition as shown in FIG. 1 to oscillate the lever 15 in one direction, and the cam 16 moves in the direction of the arrow A along rollers 8. The cutting arms 3 and 4 are pivoted about the shaft 2 as supporting points, by the forces of the spring 5, and reach the positions as shown in FIG. 2. Then, the cam 16 moves to the position X of the drawn out wire 30. A hook operating lever 32 comes into contact with a stop 31 secured to the main body bracket 1 at a position immediately before the lever 15 stops. The hook operating lever 32 oscillates, in the direction of the arrow B in FIG. 2, around a pin 33 to rotate the hook 17 in the direction of the arrow C in FIG. 2 around the shaft 18 thereby to engage the hook over the wire 30. At this time the position of the spring holding pin 20 moves, during the rotation, downwardly from a line connecting the shaft 18 with the pin 21. The hook stops at a rotation completing position due to the elastic force of the tension spring 19 and is held in this position. The operation of the piston-cylinder device 11 in the one direction stops when the parts are in this condition.

Upon the reverse operation of the cylinder 11, the hook 17 and the cam 16 retreat in the direction of the arrow D of FIG. 2. The wire 30 caught within the hook 17 is drawn into the space between the cutting edges 7 on the cutting arms 3 and 4.

When the cam 16 retreats, the wedge-shaped portion 16b of the cam 16 hits the rollers 8 to spread the rollers. The cutting arms 3 and 4 are closed against the elastic force of the springs 5. Upon the closure of the cutting arms 3 and 4, the wire 30 is cut by the cutting-edges 7, and one end 30a of the wire is clamped by the clamp portions 6. At this time, the rollers 8 are engaged by the parallel sided portion 16b of the cam 16. At the end of the retreat cam 16, the bottom end of the hook 17 comes into contact with the stop pin 22. The hook 17 rotates in the direction of arrow E around the shaft 18 as a supporting point and is restored to the first position.

The wire cutting apparatus having such a construction as described hereinabove is positioned, as shown in FIG. 3, adjacent the winding machine.

As the nozzle 35 of the flyer of the winding machine rotates in the direction of arrow F, the wire 30 is delivered from the nozzle 35 of the flyer and the wire is sequentially wound from the smallest frame 37 of the spool 36 to the largest frame 38 to provide a coil 39. When the winding operation for forming the coil 39 is completed, the wire 30 extends from the corner portion 38a of the largest frame 38 to the nozzle 35 of the flyer. With the wire in this condition, the hook 17 advances to the position X as described hereinabove to engage the wire 30 and retreats to draw the wire 30 to the position Y. The end 30a of the wire is clamped simultaneously with the cutting operation at the position Y. The coil 39, which has the cut terminal wire 30b extending therefrom, is moved between the blades 41a and 41b of the coil receiving jig 40. As the coil 39 is removed from above the spool 36, the coil receivinng jig 40 rotates 180°, in the case of a two-polarity motor coil. The winding operation is performed again to wind a coil around the spool 36.

However, the above-described conventional wire cutting apparatus has the following disadvantages.

(1) The conventional system of longitudinally oscillating a lever, to which a hook for drawing out the wire and a cam for opening or closing the cutting arm are secured, during the wire drawing operation and the wire cutting operation involves two movements, i.e., the forward oscillation and the backward oscillation, thus resulting in limited track reduction.

(2) Since the hook for drawing out the wire and the cam are mounted at a position where the oscillating radius of the lever is large, i.e., at the tip end thereof, the inertia is large, with the result that the oscillating time cannot be reduced.

(3) Since the hook for drawing the wire is actuated by a complicated mechanism to advance it past the position of the wire coming out of the coil and then pivoted downwardly to engage the wire, and the hook is retained in the pivoted position by the spring, deterioration of the spring makes the pivoting action of the hook unstable.

(4) When the electric wire leading from the spool to the nozzle of the flyer has been drawn into the space between the cutting edges 7 on the cutting arm by the hook and has been cut, the terminal wire leading to the wound coil can float upwardly rather than dropping due to its own weight when the wire diameter is small, and can get caught in the wire cutting apparatus, thus making it impossible to remove the coil from the spool.

SUMMARY OF THE INVENTION

Accordingly, one object of the present invention is to provide a wire cutting apparatus for use in a winding machine, which is free from the above-described conventional disadvantages and which has a simple construction, and operates without malfunction. Another object of the present invention is to provide a wire cutting apparatus wherein one terminal wire leading to the coil from the terminal wires formed through the drawing operation of the wire is cleared to remove the entwinement with the cutting arm, the other terminal wire leading to the nozzle of the flyer is descended together with the clamp pawl, with the result that the terminal wire is not involved in the flyer even if the terminal wire is floated after the clamp pawl has released the terminal wire. According to the present invention, there provides a wire cutting apparatus for winding machine comprising a hook lever having a rotation track capable of drawing a wire extended between a spool and a flyer, means for intermittently rotating said hook lever, means for cutting the wire disposed near said rotation track, and clamping means for retaining the cut wire. In the preferred embodiment of the present invention, there provides a wire cutting apparatus for a winding machine comprising a hook lever having a rotation track capable of drawing a wire extended between a spool and a flyer, means for intermittently rotating said hook lever, a cutting arm equipped with a pair of clamp edges retaining a pair of cutting-edges for cutting the wire, and the wire across said rotation track, a rod for clearing one of the wires after the wire cutting operation and a driving means for oscillating said rod for the scraping operation.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
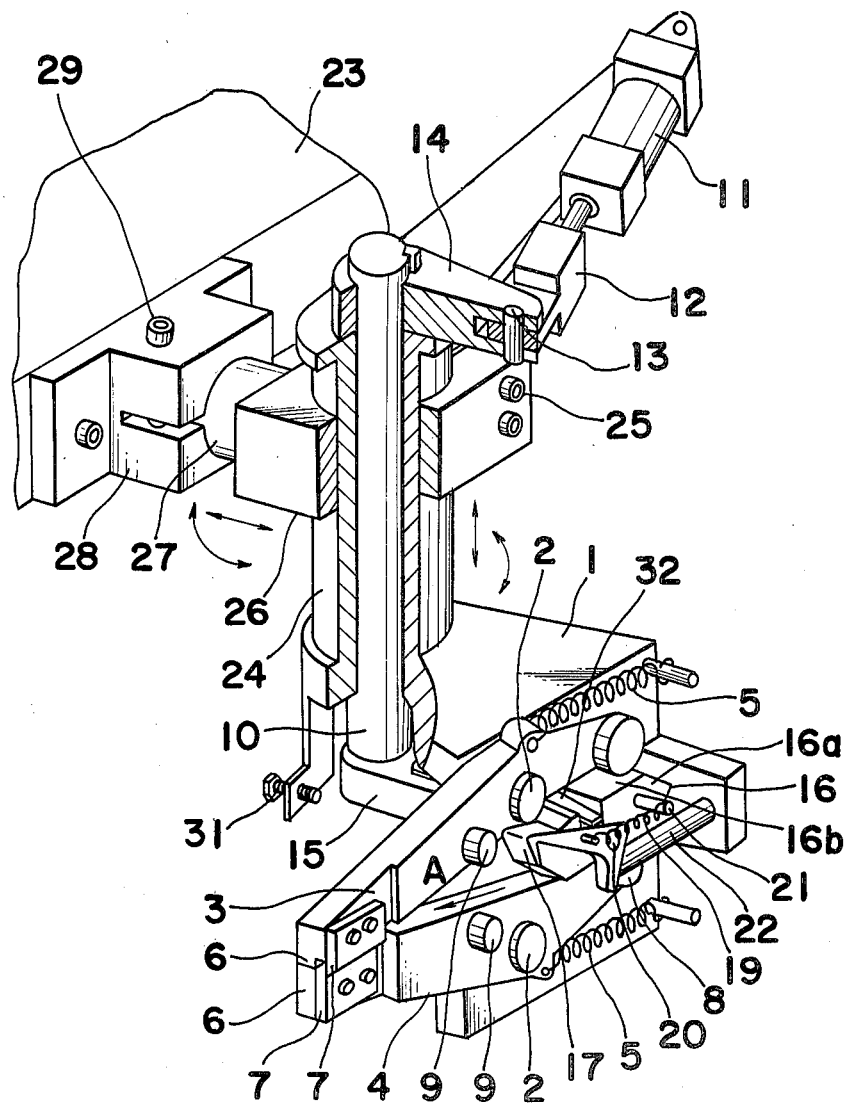
FIG. 1 is a perspective view of a wire cutting apparatus for a conventional winding machine as described above.
Figure 2:
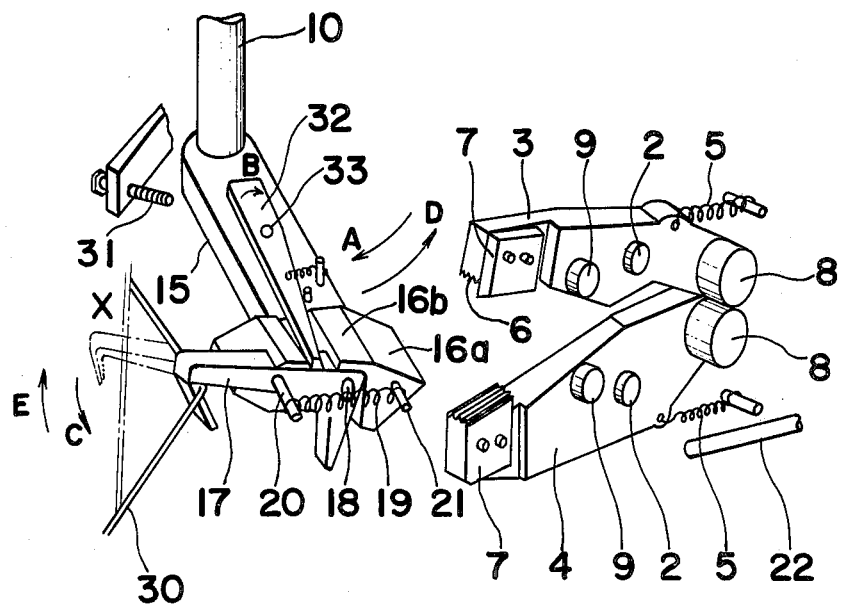
FIG. 2 is a perspective view of the essential portions of the apparatus of FIG. 1.
Figure 3:
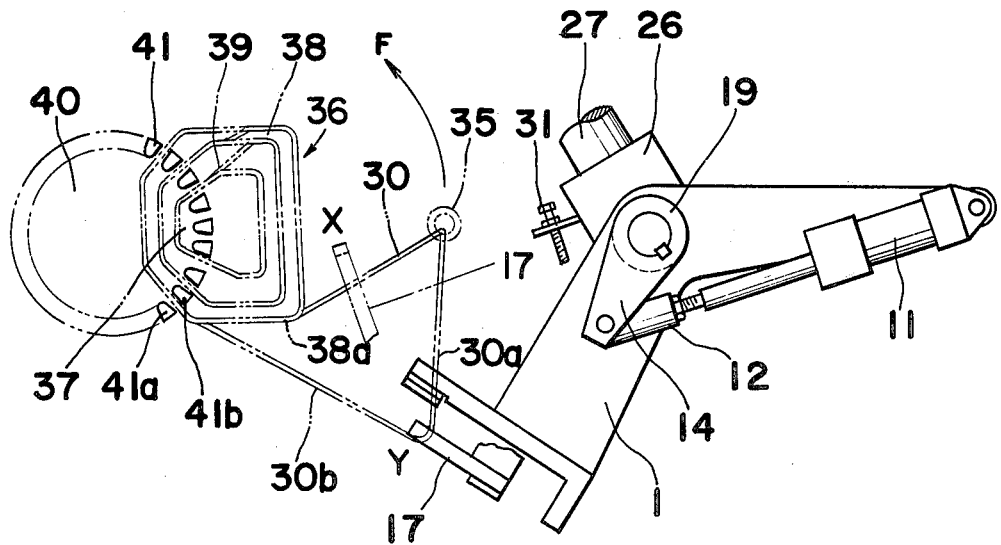
FIG. 3 is a schematic plan view showing the arrangement of the apparatus of FIG. 1 in relation to the wire winding machine.

Before proceeding with the description of the embodiments, it is to be noted that the like parts are designated the same reference numerals throughout the FIGS. 4–10.

Figure 8:
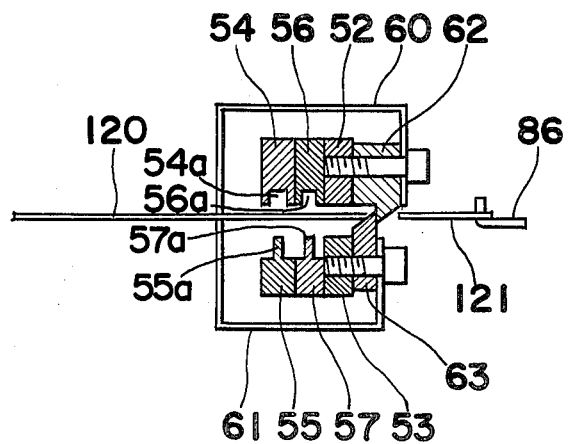
Figure 9:
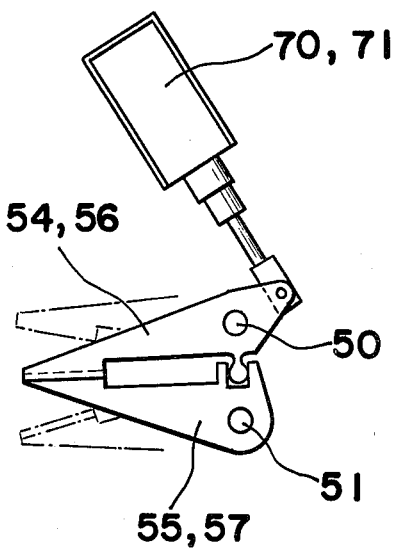
FIG. 9 is a side elevational view of the levers of the apparatus of FIG. 4.
Figure 10:
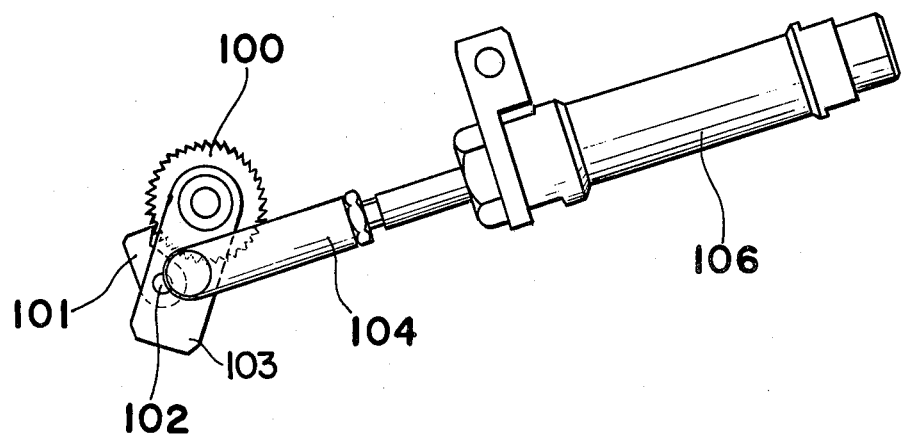
FIG. 10 is a plan view of a ratchet mechanism of the apparatus of FIG. 4.

Referring to FIG. 4 through FIG. 10, a flyer 42 rotates round a spool 43 in a known manner as described in U.S. Pat. No. 3,828,830 patented on Aug. 13, 1974. A nozzle 44 is secured to the flyer 42 to slidably guide the electric wire 45 towards the spool 43 from a rotary hook lever 86 as described later. In the known construction as described in U.S. Pat. No. 3,872,897 patented on Mar. 25, 1975, there are provided a plurality of blades 46, and a coil accommodating space 47 for arranging a coil 48 therein in the form of a groove is provided between each pair of adjacent blades 46. An electric wire 45 is wound and formed into a coil 48 round the spool 43 by the rotation of the flyer 42 so that the coil will drop into the coil accommodating spaces 47 in a known manner. A guide block 49 is provided with a pair of cutting arms 52 and 53, and two pairs of forming levers 54 and 55 and 56 and 57 and the upper arm 52 and levers 54 and 56 are rotatably supported on shaft 50 and the lower arm 53 and lower levers 55 and 57 are rotatably supported on shaft 51. A U-shaped groove 58 is located in the cutting arm 53 and in levers 55 and 57 and a U-shaped projection 59 is provided on the cutting arm 52 and on levers 54 and 56. The U-shaped projection is engaged into the U-shaped groove to open or shut the arms 52 and 53 and levers 54 and 55 and 56 and 57 in synchronous relation as shown in FIG. 9. Clamp members 60 and 61 are mounted on cutting arms 52 and 53, and cutting-edges 62 and 63 are respectively disposed on the cutting arms 52 and 53 which when they come together act as a cutter. A concave portion 54a and 56a is provided at the tip end of each of the forming levers 54 and 56. A convex portion 55a and 57a is provided at the tip end of each of the forming levers 55 and 57. When the levers close, the convex portion is engaged in the concave portion with the gap being left therebetween for deforming the wire between the convex and concave portions. A compression spring 66 normally urges the forming levers 54 and 55 and 56 and 57 in the opening direction through connectors 67, 68 and a pin 69. Solenoids 70 and 71 are adapted to operate the forming levers 54 and 56 in a direction for closing these forming levers against the action of springs 66. A rod 72 is coupled at its respective ends to a lever 75 and the cutting arm 52 through rod ends 73 and 74. The lever 75 is rotatably supported on a mounting bracket by a shaft 76 and is coupled at its one end to the rod end 74 which is coupled to the cutting arm 52 through the rod 72 and the rod end 73. A follower 77 is provided at the middle portion of the lever 75 in contact with an end face cam 78 which is connected to and rotates with the hook lever 86 through a shaft 87. A tension spring 79 is connected to lever 75 to press the cam follower 77 against the end face cam 78. A bent clearing rod 80, having an opening facing in the same direction as the opening of the cutting arms and the forming levers, is secured to a lever 81, which is rotatably supported on the guide block 49 for rotation around the shaft 51. A solenoid 82 is connected to the lever 81 through a rod 83, a connector 83a and a pin 84. A compression spring 85 around is engaged with the clearing rod 80 urging it in the direction L opposite to the operating direction of the solenoid 82. The hook lever 86 is secured to the lower end of the shaft 87 which is rotatably supported in the guide block 49 by bearings 88. The hook lever 86 is provided at its one end with a hook 86a and is secured at its other end to a shaft 87. The shaft 87 performs intermittent rotation 180° at each movement, and rotates in the direction of arrow K to rotate the hook lever 86 from a position S to a position R or from a position R to a position S. The plane in which the hook lever 86 rotates is adjacent the level of the wire 45 between the spool 43 and the nozzle 44, and hook 86a projects to the level of wire 45. The shaft 87 is provided, at its top portion, with a small gear 89 having the end face cam 78 secured thereto. A large gear 90 is engaged with the small gear 89 and having a number of teeth in a ratio of 3:1 with gear 89, and is mounted on a spline shaft 92 rotatably supported by bearing 91. The spline shaft 92 is, at its top portion, rotatably supported on a main body case 93 in bearing 94 and is engaged, at its bottom portion, with the spline aperture in the large gear 90 so that gear 90 can undergo free vertical sliding motion on shaft 92. A disc 95, which is provided, on its under face, with six counter-sunk recesses 99 equally spaced in the peripheral direction of disc 95, is secured to the spline shaft 92. A steel ball 96 is engaged in each of the recesses 99 in the disc 95 and urged thereinto by a compression spring 98 disposed in a hole provided in the stationary disc 97, thereby to position the disc 95, and a ratchet wheel 100 is secured to the disc 99. A pawl 101, which is pivotally mounted on a pin 102 on a lever 103, which in turn is pivoted on the spline shaft 92, and rotates pawl 101 rotates the ratchet wheel 100 in one direction as shown in FIG. 10 as lever 103 is pivotally oscillated. A connector 104 is connected to the lever 103 through a pin 105 and is reciprocated by a piston-cylinder device 106. A thrust bearing 107, which is provided on the top face and the bottom face of the lever 103, supports the thrust of the connector 104. A link 108, on which cylinder 106 is mounted, is rotatably supported on a mounting plate 110 by a pin 109. A piston-cylinder device 111 is secured to the mounting plate 110 by bolts 112, and the end of the rod portion thereof is connected to the guide block 49 by a connector 113. The mounting plate 110 is secured to the main body case 93. A slide shaft 114 is secured, at one end, to the main body case 93 at the other end to a plate 115 to provide a means to slidably guide the guide block 49 in its movement between the main body case 93 and plate 115. The main body case 93 has a support shaft thereon slidable in the direction of the arrow G or pivotable in the direction of arrow H in a block at the bottom of shaft 117, which in turn is slidable in or rotatable in the direction of arrow I or J in a bracket 118 secured to a main body plate 119 of the apparatus.

Figure 4:
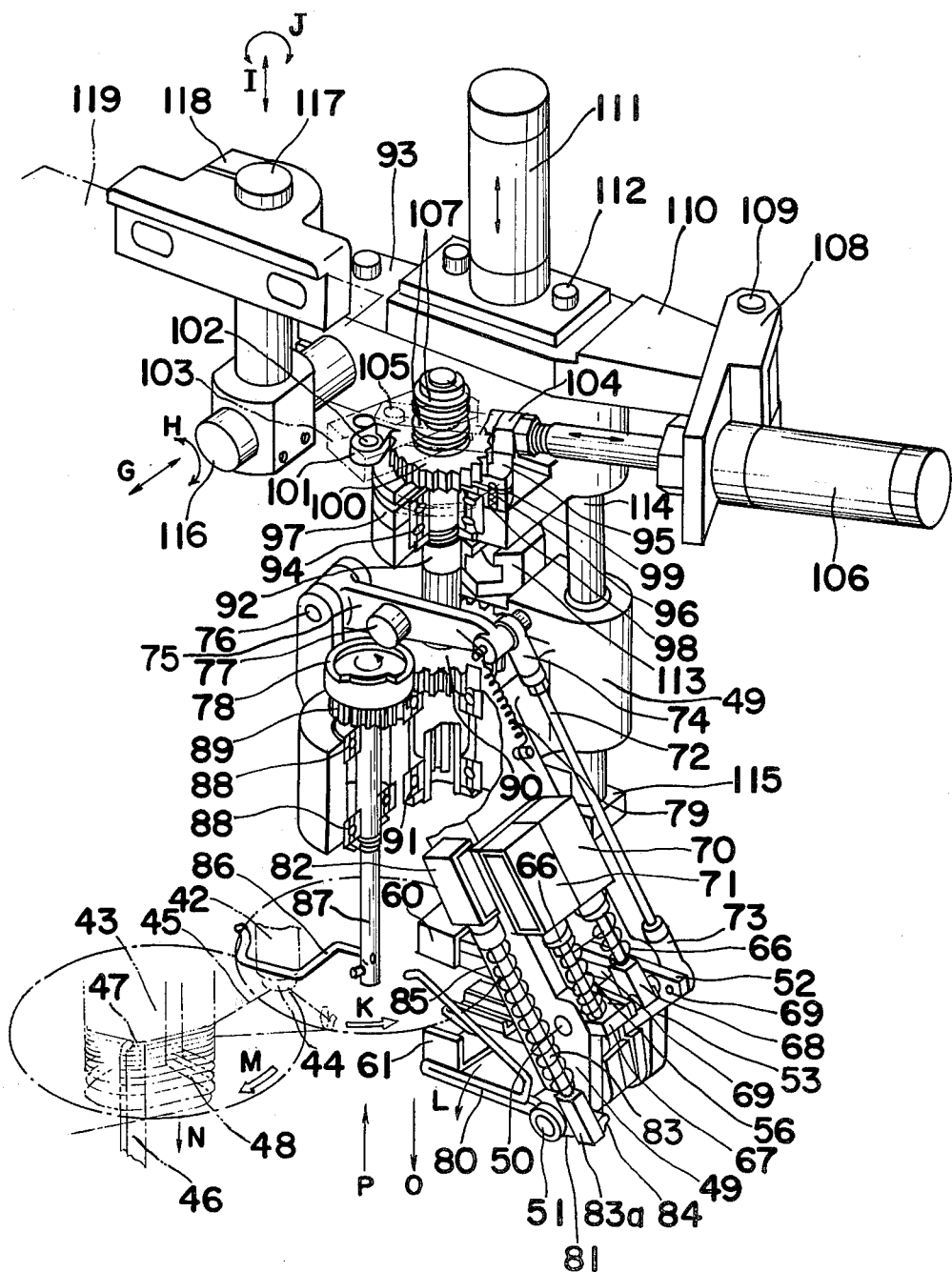
FIG. 4 is a perspective view, partially broken away, of the essential portions of a wire cutting apparatus for a wire winding machine according to one embodiment of the present invention.
Figure 5:
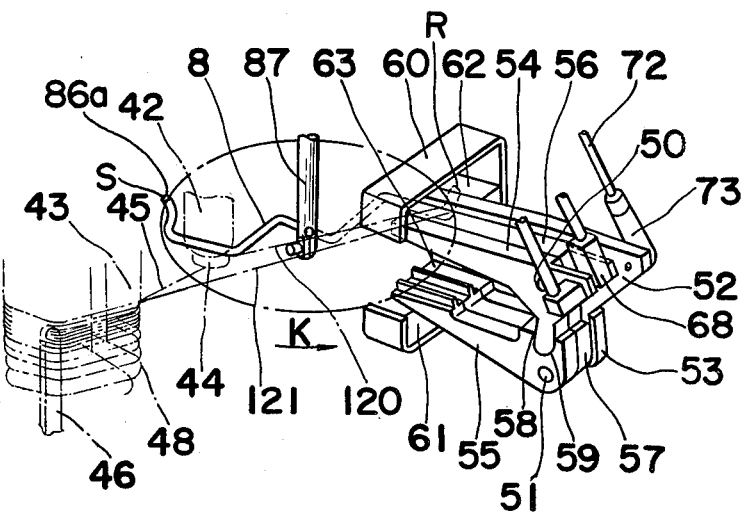
FIG. 5 is a perspective view of a portion of the apparatus of FIG. 4.
Figure 6:
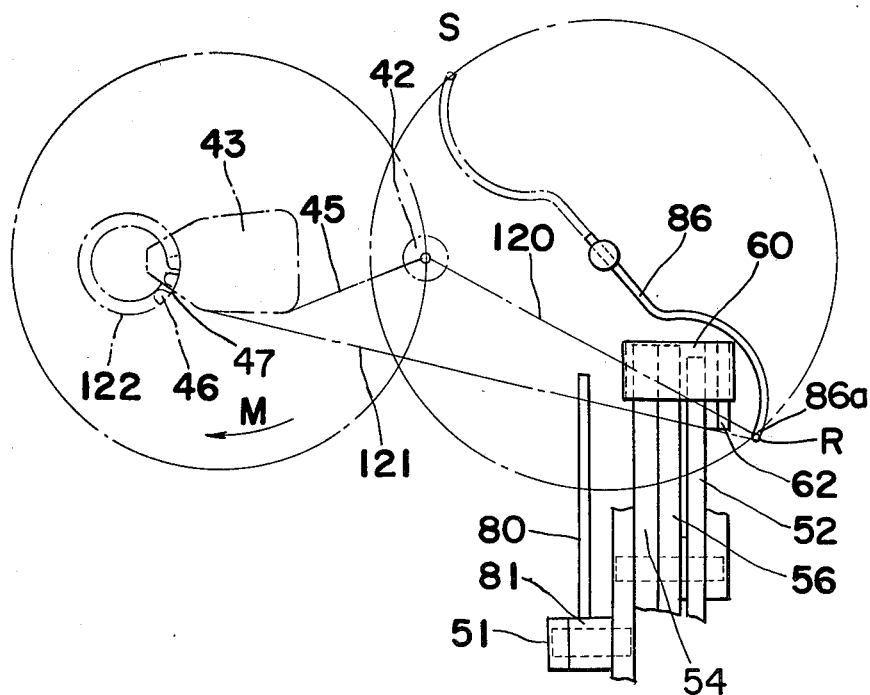
FIG. 6 is a schematic plan view on an enlarged scale, of the portion of the apparatus shown in FIG. 5.
Figure 7:
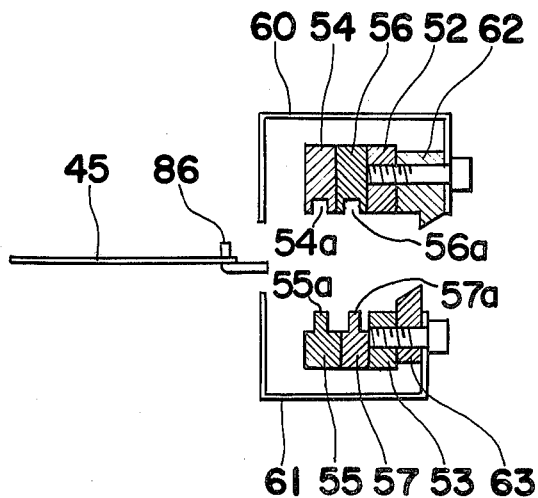
FIG. 7 and FIG. 8 are schematic views for illustrating the wire cutting operation of the apparatus of FIG. 4.

The cutting of the wire 45 and the clamping operation will be described hereinafter with reference to FIG. 4 through FIG. 6. Upon completion of the winding of the coil 48 on the spool 43 in a known manner, and with hook lever 86 in position S, the piston-cylinder device 106 is operated to oscillate the lever 103 thereby to rotate the ratchet wheel 100 60° in the direction of arrow K. During this period, the hook lever 86 is rotated 180° from the position S in the direction of an arrow K. Referring to FIG. 5, the hook lever 86, when the end with hook 86a thereon passes between the spool 43 and nozzle 44, hooks the electric wire 45 leading from the spool 43 to the nozzle 44 of the flyer 42. As shown in FIGS. 6 and 8, the hook lever 86 passes through, in the recited, order, the opening in bent rod 80, the space between the clamp members 60 and 61, the forming levers 54 and 55 and 56 and 57 and the cutting arms 52 and 53 and the cutting-edges 62 and 63 and to the position R. During this period, the electric wire 45 is drawn out to form a terminal wire 120, which leads from the nozzle 44 of the flyer 42 to the hook lever 86, and a terminal wire 121 which leads from the coil 48 to the hook lever 86. The terminal wire 120 is located between the cutting-edges 62 and 63, and the edges of clamp members 60 and 61. When the hook lever 86 passes between the cutting arms 52 and 53, the cam follower 77 is engaged by the land on the end face cam 78 to oscillate the lever 75 to close the cutting arms 52 and 53. The terminal wire 120 is cut by the cutting-edges 62 and 63 and is clamped by the edges of the clamp members 60 and 61 and is further clamped by the convex and concave portions on the forming levers by means of the operation of solenoids 70 and 71. The coil 48, which thus is provided with a cut terminal wire 121, is moved between the blades 46 of a coil receiving jig 122. At this time, the solenoid 82 is operated to oscillate the clearing rod 80 in the direction of the arrow L to clear the terminal wire 121 from between the cutting arms, forming levers and clamp members. In the case of the production of a motor coil with four polarities, when the coil 48 is removed from the spool 43, the coil receiving jig 122 rotates 90° to wind the coil around the spool 43 again. The terminal wire 120, which extends from the nozzle 44 of the flyer is retained at its one end by the edges of clamp members 60 and 61. The coil 48, formed from the electric wire 45 wound on the spool 43 by the rotation of the flyer 42 in the direction of arrow M, and including the terminal wire 120, moves downwardly together with the blades 46 in the direction of arrow N, as in the conventional apparatus. At this time the piston-cylinder device 111 is operated to lower the guide block 49, with the clamp members 60 and 61, in the direction of arrow O. Upon the operation of the piston-cylinder device 106 at the descended position, the hook lever 86 rotates 180° to return to the position S. During this period, the end face cam 78 rotates simultaneously with the hook lever 86. The cam follower 77 secured to the lever 75 moves to the recess of the end face cam 78 to open the clamp members 60 and 61 secured to the cutting arms 52 and 53 thereby to release the terminal wire 120. Thereafter, the piston-cylinder device 111 operates to raise the guide block 49 in the direction of arrow P reversely operates to rise in the direction of an arrow P until it returns to its original position. One cycle for the cutting of the wire 45 is thus completed and the next cycle will be repeated in the same manner.

With the above construction, the wire cutting apparatus for use with a winding machine in accordance with the present invention has advantages in that the hook lever for drawing the electric wire out from the path between the spool and the flyer has simplified driving mechanism, which make it possible to make the size smaller and the space occupied by the wire cutting apparatus smaller, and the process of drawing out the electric wire can be performed by one part of the intermittent motion of the hook lever. The smaller size and the lighter weight of the hook lever makes it possible to speed up the movement, and the wire is drawn to a position between the cutting arms and is cut off, and thereafter the terminal wire leading to one wound coil is cleared by a rod thereby to prevent entaglement with the wire cutting apparatus.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A wire cutting apparatus for use with a coil winding machine having a flyer movable around a spool and in which the wire extends in a path between the spool and the flyer, said wire cutting apparatus comprising: a hook lever rotatably movable in a plane adjacent the level of the wire extending in the path between the spool and the flyer, and having a hook means projecting out of said plane to the level of the wire; rotating means on which said hook lever is mounted for intermittently rotating said hook lever for engaging said hook means with the wire and drawing the wire out; cutting means actuatable for cutting the wire and disposed adjacent the path of said hook means during rotation and adjacent to which the drawn out wire is positioned at the end of one part of the intermittent rotational movement of said hook lever and at which position said cutting means cuts the wire when the cutting means is actuated; and clamping adjacent said cutting means for retaining one end of the wire when the wire is cut by said cutting means.

2. A wire cutting apparatus as claimed in claim 1 wherein said means for intermittently rotating said hook lever comprises gear means on which said hook lever is mounted, said gear means being rotatable for rotating said hook lever in said plane of rotation, a reciprocally movable connector for carrying out reciprocating movement, a piston-cylinder device for reciprocally moving said connector, and gear rotating means connected between said connector and said gear means for rotating said gear means to rotate said hook means through 180° in only one rotational direction at each reciprocation of said connector.

3. A wire cutting apparatus as claimed in claim 1 further comprising a clearing rod means adjacent said cutting means for clearing the end of the wire which remains unclamped after the wire cutting operation, and a driving means connected to said clearing rod means for oscillating said clearing rod means across the position of the unclamped end of the wire after the cutting and clamping of the wire.

4. A wire cutting apparatus as claimed in claim 3 wherein said means for intermittently rotating said hook lever comprises gear means on which said hook lever is mounted, said gear means being rotatable for rotating said hook lever in said plane of rotation, a reciprocally movable connector for carrying out reciprocating movement, a piston-cylinder device for reciprocally moving said connector, and gear rotating means connected between said connector and said gear means for rotating said gear means to rotate said hook means through 180° in only one rotational direction at each reciprocation of said connector.

5. A wire cutting apparatus as claimed in claim 3 wherein said means for oscillating said clearing rod means comprises a solenoid for oscillating said clearing rod means in the direction for clearing the cut end of the wire, and a spring means for restoring said clearing rod means to the initial position thereof.

6. A wire cutting apparatus for use with a coil winding machine having a flyer movable around a spool and in which the wire extends in a path between the spool and the flyer, said wire cutting apparatus comprising: a hook lever rotatably movable in a plane adjacent the level of the wire extending in the path between the spool and the flyer and having a hook means projecting out of said plane to the level of the wire; rotating means on which said hook lever is mounted for intermittently rotating said hook lever for engaging said hook means with the wire and drawing the wire out; cutting means actuatable for cutting the wire and having cutting edges normally in spaced opposed positions and movable toward each other for cutting a wire therebetween, said cutting edges being positioned adjacent the path of the hook means during rotation and the drawn out wire being drawn between said cutting edges at the end of one part of the intermittent rotational movement of said hook lever; actuating means connected to said cutting edges for moving said cutting edges toward each other for performing a cutting operation; clamping means adjacent said cutting means and having clamping portions normally in spaced opposed positions and movable toward each other for clamping a wire therebetween, said clamping portions being positioned adjacent the path of the hook means and adjacent said cutting edges and the drawn out wire being drawn between said clamping portions at the end of said one part of the intermittent rotational movement of said hook lever; and clamp operating means connected to said clamp portions for moving said clamping portions toward each other for clamping the wire therebetween.

* * * * *